April 1, 1941.    F. H. GIVEN    2,236,728
PROCESS OF TREATING BEARING MEMBERS
Filed May 1, 1940    2 Sheets-Sheet 2

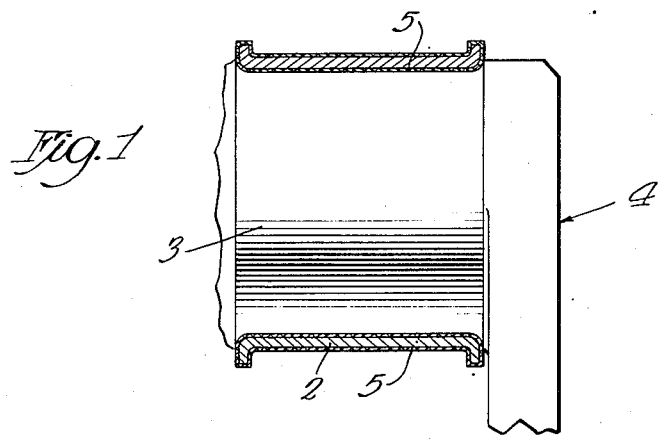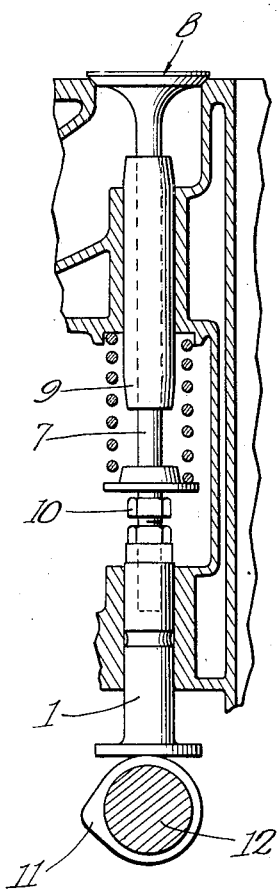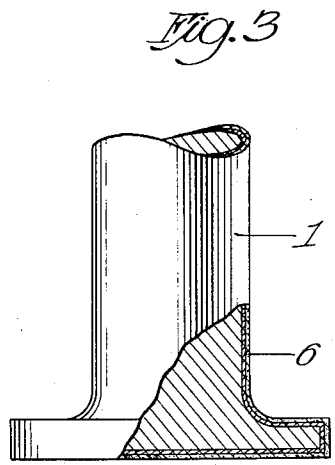

INVENTOR.
Fred H. Given
BY Davis Lindsey Smith and Shonts
ATTORNEYS.

Patented Apr. 1, 1941

2,236,728

UNITED STATES PATENT OFFICE 2,236,728

PROCESS OF TREATING BEARING MEMBERS

Fred H. Given, Hagerstown, Ind., assignor to The Perfect Circle Company, Hagerstown, Ind., a corporation of Indiana Application May 1, 1940, Serial No. 332,764

5 Claims. (Cl. 148—7)

My invention relates to improvements in process of treating bearing members and more particularly to the treatment of bearing members formed of ferrous metal and adapted to have frictional sliding contact, either rotational or reciprocating, with other parts, which frictional contact would ordinarily subject the bearing members to appreciable wear. The invention has particular application, for example, to the treatment of bearing parts of internal combustion engines and as examples of such bearing parts, I mention crank shaft bearings, tappets, cylinder walls, pistons, piston pins, piston rings and the like.

More particularly, I provide a process for forming on the bearing members a coating of iron oxide of the character described hereinafter, the coating being of such depth as to overcome scuffing or scoring or appreciable wear in service. This application is a continuation-in-part of my application, Serial No. 229,890, filed September 14, 1938, which has matured into U. S. Patent No. 2,202,773, issued May 28, 1940.

The above and other objects of my invention will be apparent from the following description taken in connection with the accompanying drawings in which—

Fig. 1 is a longitudinal section taken through a shaft bearing treated in accordance with my invention;

Fig. 2 is a section through a valve mechanism, treated in accordance with my invention;

Fig. 3 is an enlarged view of part of the valve tappet which is shown partially in section to illustrate the oxide coating.

Figure 4:
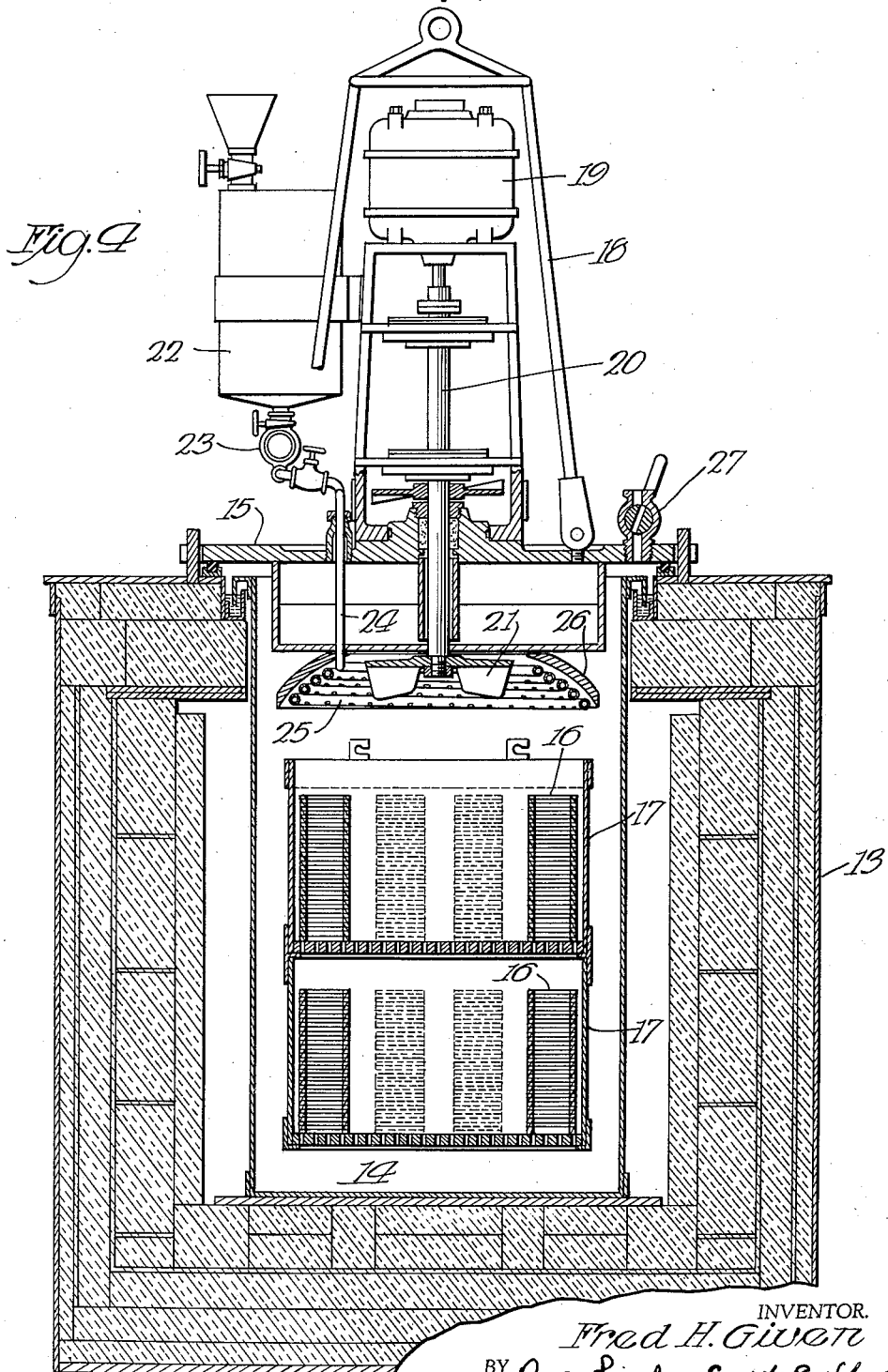
Fig. 4 illustrates in vertical section a form of apparatus for carrying out my novel process.

As shown in Fig. 1, the bearing member 2, which may be of the usual or any desired contour and which is formed of ferrous metal such as cast iron, supports the bearing portion 3 of the shaft 4 which may be the crank shaft of an internal combustion engine, for example. I have shown, somewhat exaggeratedly, a coating 5 of substantially pure black magnetic oxide ($Fe_3O_4$ or ferroso-ferric oxide) on the bearing member 2, the coating being formed by my process.

As shown in Fig. 2, the stem 7 of the valve 8 is adapted to reciprocate in a bearing sleeve 9, and the lower end of the valve stem engages an adjustable nut 10 on a valve tappet 1. A cam 11 on the cam shaft 12 engages the tappet to actuate it and the valve.

In Fig. 3, I have shown the tappet as provided with a coating 6 of iron oxide formed by my process. It will be observed that in this instance the coating 6 is illustrated as comprising two films or layers, the inner film being black in color and the outer film being gray in color, whereas in Fig. 1 the coating is shown as comprising a single black film.

I will now describe in connection with the apparatus shown in Fig. 4 my improved process for treating the bearing members in order to provide them with the oxide coatings described above.

The furnace designated generally by the numeral 13 may be of any suitable construction. The heating or oxidizing chamber 14 is adapted to be closed at the top by a removable cover 15.

The bearing members 16 which are to be treated are illustrated by piston rings stacked in suitable removable containers 17.

The cover 15 of the furnace is provided with a suitable skeleton frame 18 by which it may be raised and lowered by any suitable means. The cover supports through a suitable frame an electrical motor 19 adapted to drive a shaft 20, which at its lower end carries a fan 21.

The water tank 22 is carried by the frame supporting the motor. A suitable metering device 23, at the bottom of the tank, is connected to a pipe 24 which in turn is connected to a perforated spiral coil 25 encircling the fan and positioned within an inverted baffle cup 26. The water in the tank may be placed under air pressure.

An adjustable valve 27 which may be manually or automatically operated is mounted on the cover to provide an adjustable vent through which the air is forced and the steam is exhausted continuously during the oxidizing action.

After the containers, 17, carrying the stacked piston rings or other bearing members have been lowered in position in the oxidizing chamber, the cover 15 is lowered into position on the furnace, thus closing the oxidizing chamber. When the temperature in the oxidizing chamber ranges from 600° F. to 850° F., that is, above the condensation point of steam, the valve in the drip device 23 is adjusted to permit water from the tank to be metered into the flash coil 25 at the desired rate. The water is converted into steam by drawing heat from the furnace interior, the steam being superheated to maintained furnace temperature, in which condition the steam issues from the coil. If desired, the flash coil may be eliminated and superheated steam injected into the oxidizing chamber from some suitable outside source. The fan 21 driven by the motor aids in circulating the steam, part of which is permitted to exit from the furnace through the valve 27 in order to purge the furnace from any air, air being inimical to the operation, as it would provide a higher oxide which would be unsuitable in texture, adherence, durability and appearance for bearing surfaces. The bottoms of the containers are perforated so that the steam circulates freely through the containers and the stacks of rings.

The required temperature to which the bearing members should be heated in the furnace, the time during which the bearing members are subjected to the oxidizing action while the bearing members are at such temperature, and the quantity of steam generated are accurately controlled to give the desired character and depth of the oxide coating. An oxide coating having a thickness of about .0003" is formed by heating the bearing members to a temperature of about 1020° F. and maintaining such temperature for a period of about 30 minutes and an oxide coating having a thickness of about .0010" is formed by heating the bearing members to a temperature of about 1300° F. and maintaining such temperature for a period of about 30 minutes. To form coatings having a thickness between .0003" and .0010" the bearing members are heated to the desired intermediate temperature and such temperature is maintained for a period of about 30 minutes.

If the bearing members are now permitted to cool to below 600° F. before being withdrawn from the steam, the permanent coating on the bearing members will consist of a single film or layer of substantially pure hard, granular, black magnetic oxide having a very intimate union with the metal. In place of cooling the bearing to a temperature below 600° F. before withdrawal from the steam, the bearing may be withdrawn from the oxidizing chamber to a chamber filled with steam or an inert gas.

The film formed as above explained is that illustrated on the bearing 2 in Fig. 1.

If the bearing members are removed from the oxidizing chamber before they are partially cooled and then subjected to the atmosphere, the two film coating, as shown on the valve tappet in Fig. 3, will result. The inner black film is formed of substantially pure, hard, black magnetic oxide. The outer film, which is gray in color, is a little softer than the inner film but it is still somewhat hard and granular. It is difficult to definitely analyze the outer film, but it seems to be very similar in composition to the inner film. The two films may be either pseudo-morphic or allotropic forms of oxide, developing under the different conditions described.

I find that with the two film coating just described, the black inner film, which I know is substantially pure black magnetic oxide, has substantially the same thickness as the outer gray film and this is important to obtain the best results when the two film coating is used.

The required depth of black magnetic oxide film in either case depends upon the load and speed requirements of the bearing member and the environment and conditions of use of the member. Too thick a film will not only weaken the cross section of the bearing member but the film itself will break off since it is quite brittle. On the other hand, too thin a film will not be sufficient to accomplish the object of the invention. It should be of such depth as to substantially prevent scuffing or scoring during the normal life of the bearing member under proper operating conditions. The coating on the bearings for a crank shaft of an automobile engine, for example, should not be less than .0003" and preferably .0010".

The action of the oxide coating in accomplishing its especially advantageous results is somewhat difficult to account for and explain. Apparently, the hard granular texture of the coating and, particularly of the black layer or film is in itself resistant to wear and abrasion. The particles are quite small and durable in a brittle sense and do not cause undue disruption of the mutually frictional surfaces. The fine and durable nature of the oxide particles also appears to create a progressive polishing of the contacting friction surfaces without causing substantial wear. This polishing or mild honing action keeps the surfaces mutually parallel, prevents formation of abrading projections thereon and contributes to good lubrication and minimum friction therebetween. In some instances I have found that the oxide coating alone is a sufficient lubricating medium.

It will be understood that both of the cooperating bearing members, such for example as the valve tappet and cam 12, may be given the oxide coating though this usually is not necessary. I have found that where only one of the bearing members has been treated, as I have explained, the oxide coating thereon conditions progressively the contacting surface of the other member, some of the oxide being actually transferred from the one to the other during service.

With the two film oxide coating, the one film being black and the other one gray, as above explained, the outer softer film tends to wear away during the "run in" period. This may be beneficial. The black inner layer should be substantially as thick as the outer layer and of sufficient thickness to last during the normal use of the bearing member under proper operating conditions.

The bearing sleeve 9 (Fig. 2) may be given either oxide coating which I have described above.

I claim:

1. The process of treating bearing members of ferrous metal to form thereon a hard, granular, and wear-resistant film of black magnetic iron oxide having a depth of from .0003" to .0010" which comprises heating the bearing members to a temperature of from 600° F. to 850° F. and subjecting the bearing members to the oxidizing action of superheated steam in the substantial absence of air while the bearing members are at a temperature of from 1020° F. to 1300° F. for a period of approximately thirty minutes during which time the desired temperature of the bearing members within such range is held, and then permitting the bearing members to cool in the substantial absence of air to a temperature below 600° F.

2. The process of treating bearing members of ferrous metal to form a wear-resistant coating thereon, the coating consisting of two intimate united films, the inner film being hard and granular black magnetic iron oxide and the outer film being a softer and gray iron oxide, the method consisting in heating the bearing members to a temperature of from 600° F. to 850° F. and subjecting them to the oxidizing action of superheated steam in the substantial absence of air while the bearing members are at a temperature of from 1020° F. to 1300° F. for a period of approximately thirty minutes during which time the desired temperature of the bearing members within such range is held, and then subjecting the bearing members to air while the temperature of the members is above 600° F.

3. In a process for treating a bearing member of ferrous metal to form thereon a hard, granular and wear resistant coating of black magnetic oxide having a depth of about .0003" to .0010", the steps of: maintaining the bearing member heated to a temperature falling in the range of about 1020° F. to 1300° F. for a period of approximately 30 minutes, and simultaneously with said heating subjecting said bearing member to the oxidizing action of superheated steam in the substantial absence of air; and then allowing said bearing member to cool.

4. In a process for treating a bearing member of ferrous metal to form thereon a hard, granular and wear resistant coating of black magnetic oxide having a depth of about .0003" to .0010", the steps of: maintaining the bearing member heated to a temperature falling in the range of about 1020° F. to 1300° F. for a period of approximately 30 minutes, and simultaneously with said heating subjecting said bearing member to the oxidizing action of superheated steam in the substantial absence of air; and then allowing said bearing member to cool to a temperature at least as low as approximately 600° F. in the substantial absence of air.

5. In a process for treating a bearing member of ferrous metal to form thereon a hard, granular and wear resistant coating of black magnetic oxide having a depth of about .0003" to .0010", the steps of: maintaining the bearing member heated to a temperature falling in the range of about 1020° F. to 1300° F. for a period of approximately 30 minutes, and simultaneously with said heating subjecting said bearing member to the oxidizing action of superheated steam in the substantial absence of air; and then allowing said bearing member to cool in the presence of air to a temperature of about 600° F.

FRED H. GIVEN.